(12) United States Patent  
Kubena

(10) Patent No.: US 8,522,612 B1  
(45) Date of Patent: Sep. 3, 2013

(54) MEMS ON-CHIP INERTIAL NAVIGATION SYSTEM WITH ERROR CORRECTION

(75) Inventor: Randall L. Kubena, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 13/410,998

(22) Filed: Mar. 2, 2012

Related U.S. Application Data

(60) Division of application No. 12/027,247, filed on Feb. 6, 2008, now Pat. No. 8,151,640, which is a continuation-in-part of application No. 12/026,486, filed on Feb. 5, 2008, now abandoned.

(51) Int. Cl.  
*G01C 19/00* (2006.01)

(52) U.S. Cl.  
USPC ............... 73/504.04; 73/503.3; 73/514.16

(58) Field of Classification Search  
USPC ......... 73/504.04, 497, 503.3, 504.02, 504.03, 73/504.08, 504.18, 514.16  
See application file for complete search history.

(56) References Cited

U.S. PATENT DOCUMENTS

| | | | |
|---|---|---|---|
| 392,650 A | 11/1888 | Watrous | |
| 2,487,165 A | 11/1949 | Miller | |
| 3,390,287 A | 6/1968 | Sonderegger | |
| 3,766,616 A | 10/1973 | Staudte | 29/25.35 |
| 4,364,016 A | 12/1982 | Tanski | 333/193 |
| 4,426,769 A | 1/1984 | Grabbe | 29/588 |
| 4,442,574 A | 4/1984 | Wanuga et al. | 29/25.35 |
| 4,618,262 A | 10/1986 | Maydan et al. | |
| 4,870,313 A | 9/1989 | Hirama et al. | 310/320 |
| 4,898,031 A | 2/1990 | Oikawa et al. | 73/505 |
| 4,944,836 A | 7/1990 | Beyer et al. | 156/645 |
| 5,203,208 A | 4/1993 | Bernstein | 73/505 |
| 5,226,321 A * | 7/1993 | Varnham et al. | 73/514.02 |
| 5,260,596 A | 11/1993 | Dunn et al. | 257/414 |
| 5,421,312 A | 6/1995 | Dawson | 123/620 |

(Continued)

FOREIGN PATENT DOCUMENTS

| | | |
|---|---|---|
| DE | 44 42 033 | 5/1996 |
| DE | 19719601 | 11/1998 |

(Continued)

OTHER PUBLICATIONS

Properties of SAW resonators fabricated on quartz substrates of various qualities; Greer, J.A.; Parker, T.E.; Montress, G.K.; Ultrasonics Symposium, 1994, Proceedings., 1994 IEEE, vol. 1, Nov. 1-4, 1994; pp. 31-36 vol. 1.

(Continued)

*Primary Examiner* — Peter Macchiarolo  
*Assistant Examiner* — Samir M Shah  
(74) *Attorney, Agent, or Firm* — Ladas & Parry

(57) ABSTRACT

An on-chip navigation system, optionally combined with GPS (Global Positioning System) and/or an imaging array, which incorporates MEMS (MicroElectroMechanical Systems) components is possible by the use of careful material selection and novel bonding techniques used during fabrication. The use of MEMS components permits many of the components of a typical inertial navigation system to reside on a single chip. Because the components are in close proximity, the components can then be used to monitor the environmental changes of the chip, such as temperature and vibration, and correct for the resulting offsets of other components. This allows improved system performance even if the individual sensor components are not ideal.

14 Claims, 14 Drawing Sheets

(56) References Cited

U.S. PATENT DOCUMENTS

| | | | |
|---|---|---|---|
| 5,480,747 A | 1/1996 | Vasudev | 430/5 |
| 5,530,408 A | 6/1996 | Vig et al. | |
| 5,552,016 A | 9/1996 | Ghanayem | |
| 5,578,976 A | 11/1996 | Yao et al. | 333/262 |
| 5,589,724 A | 12/1996 | Satoh et al. | 310/348 |
| 5,604,312 A | 2/1997 | Lutz | 73/504.14 |
| 5,605,490 A | 2/1997 | Laffey et al. | 451/36 |
| 5,644,139 A * | 7/1997 | Allen et al. | 250/557 |
| 5,646,346 A | 7/1997 | Okada | 73/504.4 |
| 5,648,849 A | 7/1997 | Canteloup et al. | |
| 5,658,418 A | 8/1997 | Coronel et al. | |
| 5,665,915 A | 9/1997 | Kobayashi et al. | 73/514.32 |
| 5,666,706 A | 9/1997 | Tomita et al. | 29/25.35 |
| 5,668,057 A | 9/1997 | Eda et al. | 438/113 |
| 5,728,936 A | 3/1998 | Lutz | 73/504.15 |
| 5,783,749 A * | 7/1998 | Lee et al. | 73/504.12 |
| 5,894,090 A | 4/1999 | Tang et al. | 73/504.02 |
| 5,905,202 A | 5/1999 | Kubena et al. | 73/504.15 |
| 5,920,012 A | 7/1999 | Pinson | 73/504.13 |
| 5,928,532 A | 7/1999 | Koshimizu et al. | |
| 5,942,445 A | 8/1999 | Kato et al. | |
| 5,959,206 A | 9/1999 | Ryrko | |
| 5,981,392 A | 11/1999 | Oishi | |
| 5,987,985 A | 11/1999 | Okada | 73/504.04 |
| 6,009,751 A | 1/2000 | Ljung | 73/504.02 |
| 6,044,705 A | 4/2000 | Neukermans et al. | 73/504.02 |
| 6,049,702 A | 4/2000 | Tham et al. | |
| 6,081,334 A | 6/2000 | Grimbergen et al. | |
| 6,094,985 A | 8/2000 | Kapels et al. | 73/504 |
| 6,114,801 A | 9/2000 | Tanaka | |
| 6,145,380 A | 11/2000 | MacGugan et al. | 73/493 |
| 6,151,964 A | 11/2000 | Nakajima | 73/488 |
| 6,155,115 A | 12/2000 | Ljung | 73/504.12 |
| 6,164,134 A | 12/2000 | Cargille | 73/504.02 |
| 6,182,352 B1 | 2/2001 | Deschenes et al. | 29/602.1 |
| 6,196,059 B1 | 3/2001 | Kosslinger | 73/61.49 |
| 6,204,737 B1 | 3/2001 | Ella | |
| 6,207,008 B1 | 3/2001 | Kijima | |
| 6,236,145 B1 | 5/2001 | Biernacki | |
| 6,250,157 B1 | 6/2001 | Touge | 73/504.12 |
| 6,263,552 B1 | 7/2001 | Takeuchi et al. | 29/25.35 |
| 6,282,958 B1 | 9/2001 | Fell et al. | 73/504.13 |
| 6,289,733 B1 | 9/2001 | Challoner et al. | 73/504.12 |
| 6,297,064 B1 | 10/2001 | Koshimizu | |
| 6,349,597 B1 | 2/2002 | Folkmer et al. | 73/504.08 |
| 6,367,326 B1 | 4/2002 | Okada | 73/504.13 |
| 6,367,786 B1 | 4/2002 | Gutierrez et al. | 267/136 |
| 6,413,682 B1 | 7/2002 | Shibano et al. | |
| 6,417,925 B1 | 7/2002 | Naya | 356/445 |
| 6,424,418 B2 | 7/2002 | Kawabata et al. | 356/445 |
| 6,426,296 B1 | 7/2002 | Okojie | |
| 6,432,824 B2 | 8/2002 | Yanagisawa | |
| 6,481,284 B2 | 11/2002 | Geen et al. | 73/504.02 |
| 6,481,285 B1 | 11/2002 | Shkel et al. | 73/504.13 |
| 6,492,195 B2 | 12/2002 | Nakanishi | 438/106 |
| 6,513,380 B2 | 2/2003 | Reeds et al. | 73/504.04 |
| 6,514,767 B1 | 2/2003 | Natan | |
| 6,515,278 B2 | 2/2003 | Wine et al. | 250/234 |
| 6,571,629 B1 | 6/2003 | Kipp | |
| 6,584,845 B1 | 7/2003 | Gutierrez et al. | 73/488 |
| 6,614,529 B1 | 9/2003 | Tang | |
| 6,621,158 B2 | 9/2003 | Martin et al. | 257/704 |
| 6,627,067 B1 | 9/2003 | Branton et al. | |
| 6,628,177 B2 | 9/2003 | Clark et al. | 333/196 |
| 6,629,460 B2 | 10/2003 | Challoner | 73/504.02 |
| 6,651,027 B2 * | 11/2003 | McCall et al. | 702/141 |
| 6,710,681 B2 | 3/2004 | Figueredo et al. | |
| 6,715,352 B2 | 4/2004 | Tracy | 73/504.02 |
| 6,744,335 B2 | 6/2004 | Ryhanen | |
| 6,750,728 B2 | 6/2004 | Takahashi | |
| 6,756,304 B1 | 6/2004 | Robert | |
| 6,768,396 B2 | 7/2004 | Klee et al. | |
| 6,796,179 B2 | 9/2004 | Bae et al. | 73/504.12 |
| 6,806,557 B2 | 10/2004 | Ding | 257/659 |
| 6,815,228 B2 | 11/2004 | Usui et al. | |
| 6,856,217 B1 | 2/2005 | Clark et al. | 333/186 |
| 6,862,398 B2 | 3/2005 | Elkind et al. | |
| 6,883,374 B2 | 4/2005 | Fell et al. | 73/504.13 |
| 6,915,215 B2 | 7/2005 | Closkey et al. | |
| 6,933,164 B2 | 8/2005 | Kubena | |
| 6,943,484 B2 | 9/2005 | Clark et al. | |
| 6,985,051 B2 | 1/2006 | Nguyen et al. | 333/186 |
| 7,057,331 B2 | 6/2006 | Shimodaira et al. | |
| 7,118,657 B2 | 10/2006 | Golovchenko et al. | |
| 7,152,290 B2 | 12/2006 | Junhua et al. | 29/25.35 |
| 7,168,318 B2 | 1/2007 | Challoner et al. | 73/504.13 |
| 7,211,933 B2 | 5/2007 | Kawakubo | |
| 7,224,245 B2 | 5/2007 | Song et al. | |
| 7,232,700 B1 | 6/2007 | Kubena | |
| 7,234,214 B2 | 6/2007 | Xu | |
| 7,237,315 B2 | 7/2007 | Kubena et al. | 29/594 |
| 7,317,354 B2 | 1/2008 | Lee | |
| 7,446,628 B2 | 11/2008 | Morris, III | |
| 7,459,099 B2 | 12/2008 | Kubena et al. | 216/57 |
| 7,459,992 B2 | 12/2008 | Matsuda et al. | |
| 7,479,846 B2 | 1/2009 | Inoue et al. | |
| 7,490,390 B2 | 2/2009 | Kawakubo et al. | |
| 7,543,496 B2 * | 6/2009 | Ayazi et al. | 73/504.12 |
| 7,551,054 B2 | 6/2009 | Mizuno et al. | |
| 7,555,824 B2 | 7/2009 | Chang | 29/594 |
| 7,557,493 B2 | 7/2009 | Fujimoto | |
| 7,559,130 B2 | 7/2009 | Kubena et al. | 29/594 |
| 7,564,177 B2 | 7/2009 | Yoshimatsu | |
| 7,579,748 B2 | 8/2009 | Kuroda | |
| 7,579,926 B2 | 8/2009 | Jhung | |
| 7,581,443 B2 * | 9/2009 | Kubena et al. | 73/504.12 |
| 7,663,196 B2 | 2/2010 | Liu et al. | |
| 7,671,427 B2 | 3/2010 | Kim et al. | |
| 7,675,224 B2 | 3/2010 | Tanaya | |
| 7,750,535 B2 | 7/2010 | Kubena et al. | |
| 7,757,393 B2 * | 7/2010 | Ayazi et al. | 29/847 |
| 7,791,431 B2 | 9/2010 | Piazza et al. | |
| 7,802,356 B1 | 9/2010 | Chang | |
| 7,830,074 B2 | 11/2010 | Kubena | |
| 7,872,548 B2 | 1/2011 | Nishihara et al. | |
| 7,884,930 B2 | 2/2011 | Kirby et al. | |
| 7,895,892 B2 * | 3/2011 | Aigner | 73/504.01 |
| 7,994,877 B1 | 8/2011 | Kubena | |
| 8,138,016 B2 | 3/2012 | Chang | |
| 8,151,640 B1 | 4/2012 | Kubena | |
| 8,176,607 B1 | 5/2012 | Kubena | |
| 2002/0066317 A1 | 6/2002 | Lin | 73/170.33 |
| 2002/0072246 A1 | 6/2002 | Goo et al. | |
| 2002/0074947 A1 | 6/2002 | Tsukamoto | |
| 2002/0107658 A1 * | 8/2002 | McCall et al. | 702/141 |
| 2002/0185611 A1 | 12/2002 | Menapace et al. | |
| 2003/0003608 A1 | 1/2003 | Arikado et al. | |
| 2003/0010123 A1 | 1/2003 | Malvern et al. | 73/514.32 |
| 2003/0029238 A1 | 2/2003 | Challoner | 73/504.02 |
| 2003/0196490 A1 * | 10/2003 | Cardarelli | 73/504.02 |
| 2003/0205948 A1 | 11/2003 | Lin et al. | |
| 2004/0055380 A1 | 3/2004 | Shcheglov et al. | 73/504.13 |
| 2004/0065864 A1 | 4/2004 | Vogt et al. | |
| 2004/0189311 A1 | 9/2004 | Glezer | 436/104 |
| 2004/0211052 A1 | 10/2004 | Kubena et al. | 29/594 |
| 2005/0034822 A1 | 2/2005 | Kim et al. | |
| 2005/0062368 A1 | 3/2005 | Hirasawa | |
| 2005/0093659 A1 | 5/2005 | Larson et al. | |
| 2005/0156309 A1 | 7/2005 | Fujii | 257/702 |
| 2005/0260792 A1 | 11/2005 | Patel | 438/107 |
| 2006/0016065 A1 | 1/2006 | Nagaura | |
| 2006/0022556 A1 | 2/2006 | Bail et al. | |
| 2006/0055479 A1 | 3/2006 | Okazaki et al. | |
| 2006/0066419 A1 | 3/2006 | Iwaki | |
| 2006/0197619 A1 | 9/2006 | Oishi et al. | |
| 2006/0213266 A1 * | 9/2006 | French et al. | 73/504.02 |
| 2006/0252906 A1 | 11/2006 | Godschalx et al. | 528/86 |
| 2007/0017287 A1 * | 1/2007 | Kubena et al. | 73/504.02 |
| 2007/0034005 A1 * | 2/2007 | Acar et al. | 73/504.02 |
| 2007/0205839 A1 | 9/2007 | Kubena et al. | 331/158 |
| 2007/0220971 A1 * | 9/2007 | Ayazi et al. | 73/504.02 |
| 2007/0240508 A1 * | 10/2007 | Watson | 73/504.12 |
| 2008/0034575 A1 | 2/2008 | Chang et al. | 29/594 |
| 2008/0074661 A1 | 3/2008 | Zhang | |

| | | | |
|---|---|---|---|
| 2008/0096313 | A1 | 4/2008 | Patel .......................... 438/107 |
| 2008/0148846 | A1* | 6/2008 | Whelan et al. ............. 73/504.12 |
| 2009/0146527 | A1 | 6/2009 | Lee et al. |
| 2009/0189294 | A1 | 7/2009 | Chang |
| 2010/0020311 | A1 | 1/2010 | Kirby |

FOREIGN PATENT DOCUMENTS

| | | |
|---|---|---|
| EP | 0 461 761 | 12/1991 |
| EP | 0 531 985 | 3/1993 |
| EP | 1055908 | 11/2000 |
| EP | 0 971 208 | 12/2000 |
| JP | 57-091017 | 6/1982 |
| JP | 401129517 | 5/1989 |
| JP | 4322507 | 11/1992 |
| JP | 05286142 A | 11/1993 |
| JP | 06232678 | 8/1994 |
| JP | 6-318533 | 11/1994 |
| JP | 8330878 | 12/1996 |
| JP | 9-247025 | 9/1997 |
| JP | 2003-318685 | 11/2003 |
| JP | 2005-180921 A | 7/2005 |
| JP | 2006-352487 | 12/2006 |
| KR | 10-2001-0110428 A | 12/2001 |
| WO | 84-00082 | 1/1984 |
| WO | 96/38710 | 12/1996 |
| WO | 98/15799 | 4/1998 |
| WO | 00/68640 | 11/2000 |
| WO | 01/44823 | 6/2001 |
| WO | 01/74708 | 10/2001 |
| WO | 02/12873 | 2/2002 |
| WO | 2005/121769 | 12/2005 |
| WO | 2006/010206 | 2/2006 |
| WO | 2006/103439 | 10/2006 |

OTHER PUBLICATIONS

Abe, Takashi, et al., "One-chip multichannel quartz crystal microbalance (QCM) fabricated by Deep RIE," Sensors and Actuators, vol. 82, pp. 139-143 (2000).
Cleland, A.N., et al., "Fabrication of high frequency nanometer scale mechanical resonators from bulk Si crystals," Appl. Phys. Lett., vol. 69, No. 18, pp. 2653-2655 (Oct. 28, 1996).
U.S. Appl. No. 12/027,247, Kubena, filed Feb. 6, 2008.
Evoy, S., et al., "Temperature-dependent internal friction in silicon nanoelectromechanical systems," Applied Physics Letters, vol. 77, No. 15, pp. 2397-2399 (Oct. 9, 2000).
Wright et al., "The HRG Applied to a Satellite Attitude Reference System," Guidance and Control, AASAAS, 1994, 86:1-13.
Putty et al., "A Micromachined Vibrating Ring Gyroscope,", Solid State Sensor and Actuator Workshop, Transducer Research Foundation, Hilton Head, 1994, pp. 213-220.
Tang et al., "A Packaged Silicon MEMS Vibratory Gyroscope for Microspacecraft," Proceedings IEEE, 10th Annual Int. Workshop on MEMS, Japan, 1997, pp. 500-505.
Barbour et al., "Micromechanical Silicon Instrument and Systems Development at Draper Laboratory," AIAA Guidance Navigation and Control Conference, 1996, Paper No. 96-3709.
Johnson et al., "Surface Micromachined Angular Rate Sensor," A1995 SAE Conference, Paper No. 950538, pp. 77-83.

Fujita et al., "Disk-shaped bulk micromachined gyroscope with vacuum sealing," Sensors and Actuators A:Physical, vol. 82, May 2000, pp. 198-204.
Skulski et al., "Planar resonator sensor for moisture measurements", Microwaves and Radar, 1998, MIKON '98, 12th International Conf., vol. 3, May 20-22, 1998, pp. 692-695.
Tang et al., "Silicon Bulk Micromachined Vibratory Gyroscope," Jet Propulsion Lab.
Sirbuly, Donald J. et al., Multifunctional Nanowire Evanescent Wave Optical Sensors, Advanced Materials, 2007 (published online: Dec. 5, 2006), 19, pp. 61.
White, Lan M., et al., Increasing the Enhancement of SERS with Dielectric Microsphere Resonators, Spectroscopy-Eugene, Apr. 2006.
Yan, Fei, et al., "Surface-enhanced Raman scattering (SERS) detection for chemical and biological agents," IEEE Sensors Journal, vol. 5, No. 4, Aug. 2005.
U.S. Appl. No. 11/818,797, Kirby, filed Jun. 14, 2007.
Sirbuly, Donald J. et al., Multifunctional Nanowire Evanescent Wave Optical Sensors, Advanced Materials, 2007 (published online: Dec. 5, 2006), 19, pp. 61-66.
U.S. Appl. No. 13/648,041 "Quartz-Based Disk Resonator Gyro With Ultra-Thin Conductive Outer Electrodes and Method of Making Same", Kubena et. al., Application & Office Actions.
U.S. Appl. No. 13/648,041, Kubena, filed Oct. 9, 2012.
U.S. Appl. No. 10/426,931, Kubena, filed Apr. 30, 2003.
U.S. Appl. No. 11/043,378, Kubena, filed Jan. 25, 2005.
U.S. Appl. No. 11/458,911, Kubena, filed Jul. 20, 2006.
U.S. Appl. No. 11/502,336, Chang, filed Aug. 9, 2006.
U.S. Appl. No. 11/800,289, Kubena, filed May 4, 2007.
U.S. Appl. No. 11/800,294, Kubena, filed May 4, 2007.
U.S. Appl. No. 11/881,461, Kubena, filed Jul. 27, 2007.
U.S. Appl. No. 12/034,852, Chang, filed Feb. 21, 2008.
U.S. Appl. No. 12/145,678, Kirby, filed Jun. 25, 2008.
U.S. Appl. No. 12/179,579, Kubena, filed Jul. 24, 2008.
U.S. Appl. No. 12/268,309, Kubena, filed Nov. 10, 2008.
U.S. Appl. No. 12/399,680, Chang, filed Mar. 6, 2009.
U.S. Appl. No. 12/488,784, Kubena, filed Jun. 22, 2009.
U.S. Appl. No. 12/575,634, Kubena, filed Oct. 8, 2009.
U.S. Appl. No. 12/820,761, Chang, filed Jun. 22, 2010.
U.S. Appl. No. 12/831,028, Chang, filed Jul. 6, 2010.
U.S. Appl. No. 13/163,357, Kubena, filed Jun. 7, 2011.
U.S. Appl. No. 13/434,144, Kubena, filed Mar. 29, 2012.
Aaltonen, T., et al., "ALD of Rhodium thin films from Rh(acac)$_3$ and Oxygen," Electrochemical and Solid-State Lett. 8, C99 (2005).
Burdess et al., "The Theory of a Piezoelectric Disc Gyroscope", Jul. 1986, IEEE vol. AES 22, No. 4; p. 410-418.
Lin, J. W, et al., "A Robust High-Q Micromachined RF Inductor for RFIC Applications," IEEE Transactions on Electronic Devices, vol. 52, No. 7, pp. 1489-1496 (Jul. 2005).
Park, K.J., et al., "Selective area atomic layer deposition of rhodium and effective work function characterization in capacitor structures," Applied Physics Letters 89, 043111 (2006).

* cited by examiner

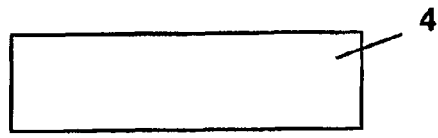
Figure 2A
(Prior Art)
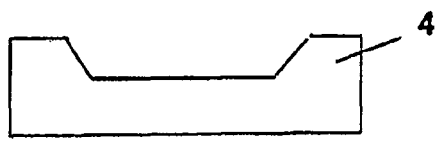
Figure 2B
(Prior Art)
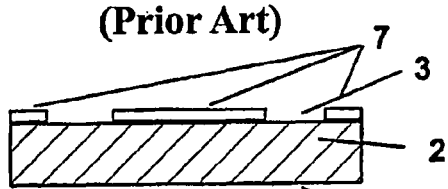
Figure 2C
(Prior Art)
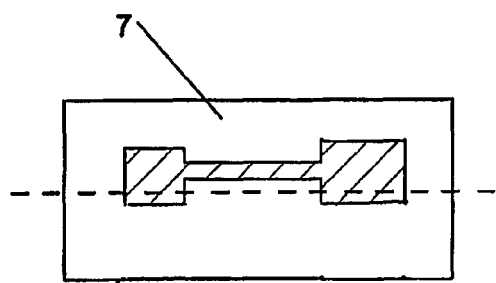
Figure 2C-P
(Plan View of 2C)
(Prior Art)
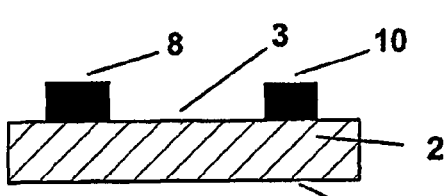
Figure 2D
(Prior Art)
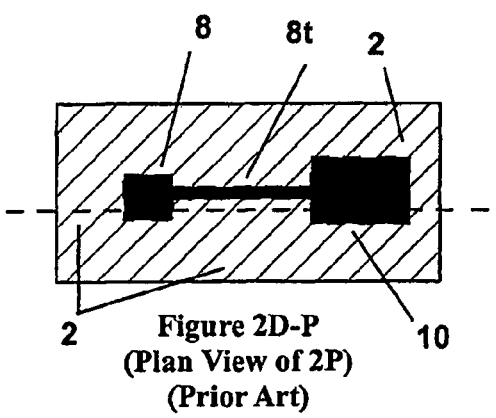
Figure 2D-P
(Plan View of 2P)
(Prior Art)

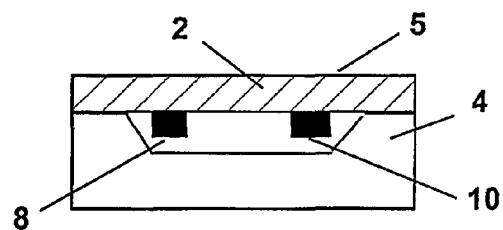
Figure 2E
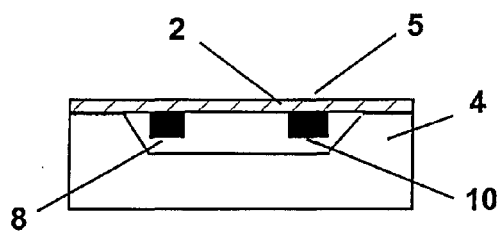
Figure 2F
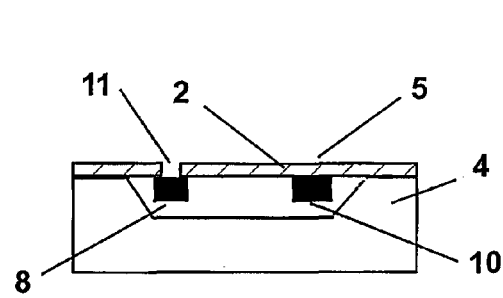
Figure 2G
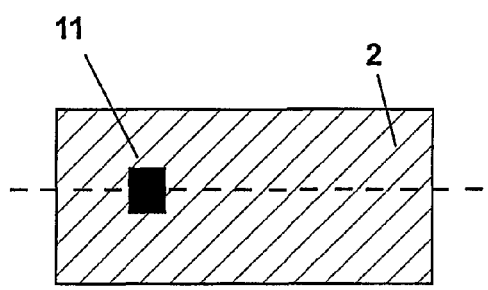
Figure 2G-P
(Plan View of 2G)

Figure 2H-P
(Plan View of 2H)

Figure 2I-P
(Plan View of 2I)

MEMS ON-CHIP INERTIAL NAVIGATION SYSTEM WITH ERROR CORRECTION

CROSS-REFERENCE TO RELATED APPLICATIONS

This application is a divisional of U.S. application Ser. No. 12/027,247 by R. Kubena, entitled "MEMS On-Chip Inertial Navigation System with Error Correction" filed on Feb. 6, 2008, which is also continuation-in-part of U.S. application Ser. No. 12/026,486 filed on Feb. 5, 2008, the contents of which are hereby incorporated by reference in its entirety.

INCORPORATION BY REFERENCE

References cited within this application, including patents, published patent applications other publications, such as listed below:
1. US Publication 20070017287, published Feb. 25, 2007, titled "Disc Resonator Gyroscopes,"
2. 60/376,995, filed Apr. 30, 2002, titled "A Fabrication Method for Integrated MEMS Quartz Resonator Arrays," and
3. Ser. No. 11/502,336, filed Aug. 9, 2006, titled "Large Area Integration of Quartz Resonators with Electronics,"

are hereby incorporated by reference in their entirety.

BACKGROUND

1. Field

This disclosure is generally related to an on-chip navigation system and in particular to a hazardous environment navigation system based on MEMS (MicroElectroMechanical Systems) technology whereby the proximity of the sensors allow them to monitor the common environment of the chip and provide data to correct for sensor errors due to changes in the environment.

2. Description of Related Art

Typically, the INS (Inertial Navigation System) in an aircraft consists of three angular rate sensors, three accelerometers, and GPS (Global Positioning System) made up electronic boards with custom ASICs (Application Specific Integrated Circuits), RF (Radio Frequency) hybrids, and commercial off-chip oscillators and filters. These components are packaged in multiple boxes which can be decoupled mechanically and thermally.

An ovenized quartz oscillator having an MEMS accelerometer exists, the accelerometer being built into a unit. However, the quartz oscillator and the MEMS accelerometer are not located on a common substrate. Therefore, the accuracy of compensation is compromised. In addition, the unit having the ovenized quartz oscillator and the accelerometer is constructed with numerous components, is bulky, and has no gyroscopes or similar inertial or navigational capability. Further, the typical GPS (Global Positioning System) does not have on-chip oscillators, on-chip temperature monitors, or on-chip inertial sensors.

BRIEF SUMMARY

Embodiments of the present disclosure provide an assembly and method for making an inertial navigation system (INS) that resides on a single chip in such a way as to allow components of the INS to act as error-correction monitors for other components. The INS may also include GPS and/or optical sensors. Those additional systems can also provide error-correction data for the other sensors and can also benefit from the error-correction data from the other sensors.

This was previously considered problematic because the fabrication of the gyroscope component utilized techniques that endangered the fragile oscillator resonator. However, by utilizing MEMS fabrication techniques, careful selection of component material, and low-temperature bonding techniques, INS components—such as a disk resonator gyroscope (DRG) and a quartz resonator oscillator—can now be placed on the same substrate (i.e. on the same chip) in close proximity to each other.

Because the INS disclosed is completely chip fabricated, it can also be integrated onto the same chip as a GPS. Additionally, an optical sensor array can be directly bonded to the chip. This provides a compact INS with GPS device. The compactness of the device (i.e. the close proximity of the sensors to each other) allow each sensor to act as an error-correction monitor by, in addition to providing navigation data, providing environmental data to the signal processor. The signal processor's computation of the sensor readings can then include compensating for the errors induced by changes in the environment. In this way, the output of the INS/GPS retains high accuracy even if the device is placed in a harsh environment (high temperatures, sudden physical impact, external vibrations, etc.).

EXAMPLE EMBODIMENTS

Briefly described embodiments of the system, method, and process of the disclosure, among others, are as follows.

The present disclosure can be viewed at least as providing an inertial navigation system apparatus. The apparatus may include an on-chip inertial navigation system assembly comprising: a semiconductor substrate; a gyroscope on the semiconductor substrate, the gyroscope including a first material; and an oscillator on the semiconductor substrate, the oscillator including a resonator, the resonator including a second material different from the first material; wherein the first material is of a type that is able be etched by a process that would not etch the second material.

The present disclosure can also be viewed as providing a method error correction for the apparatus. The method could include a method of error-correcting in an on-chip inertial navigation system apparatus as described in claim 1, the method comprising: collecting motion data from the gyroscope; collecting timing data from the oscillator; adjusting the timing data based on the motion data; calculating temperature data based on the timing; and retuning the gyroscope based on the temperature data.

The present disclosure also reveals a fabrication process for the apparatus. The process may include a process for fabricating an on-chip inertial navigation system apparatus, the process comprising: providing a semiconductor substrate; depositing an oscillator on the semiconductor substrate, the oscillator including a resonator being composed of a first material; bonding a gyroscope resonator wafer to the semiconductor substrate with a low-temperature bonding technique, the gyroscope resonator wafer being composed of a second material; and etching the gyroscope resonator wafer after it is bonded to the semiconductor substrate and after the oscillator is deposited on the semiconductor substrate, the etching using an etching technique that will etch the second material but not etch the first material, the etching forming a gyroscope.

Other apparatuses, methods, features, and advantages of the present disclosure will be, or will become apparent, to a person having ordinary skill in the art upon examination of the following drawings and detailed description. It is intended that all such additional apparatuses, methods, features, and advantages included within this description, be within the scope of the present disclosure.

BRIEF DESCRIPTION OF THE FIGURES

FIGS. 2A-2M, including plan views 2C-P, 2D-P, 2G-P, 2H-P, and 2I-P, depict a process for fabricating a quartz resonator on a CMOS wafer (prior art).

DETAILED DESCRIPTION

For all the figures, the term "top-side" refers to the orientation as shown in the figure being referred to: in operation, the chip can be oriented as needed for the particular application. For visual clarity, the components of the figures are not drawn to scale, but the combination of disclosure below and what is previously known in the art provides one skilled in the art with the actual proportions.

Figure 1:
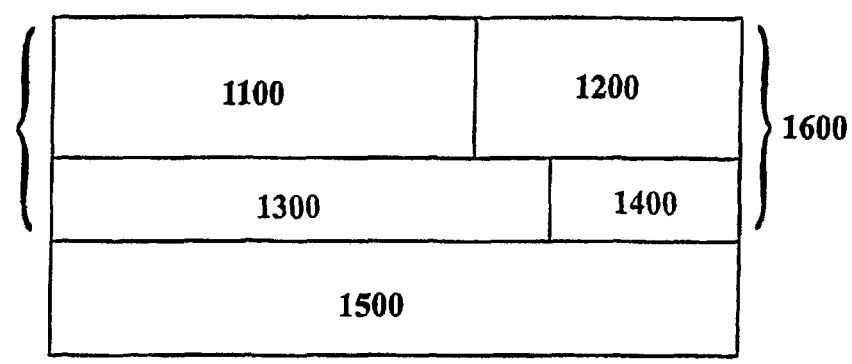
FIG. 1 depicts a block diagram of the components of an example of the disclosed apparatus.

FIG. 1 depicts a block diagram of the components of an example of the disclosed apparatus.

Gyroscope 1100

A gyroscope 1100 can be MEMS fabricated onto a substrate (i.e. chip 1600). One example of this is the disk resonator gyroscope (DRG). In operation, the DRG 1100 operates as a multi-axes rate sensor since the wine-glass mode excites two orthogonal rocking modes about the stem when the gyro is rotated about the x or y in-plane axes. This rocking mode can be tuned to the wineglass mode frequency and detected by electrodes located under the gyroscope disk on the electronic substrate run in differential mode. The common mode signal on these electrodes can detect a vertical acceleration. Finally, additional electrodes on the side of the resonator can be used to detect both x and y lateral accelerations of the disk. These acceleration readings would reveal sudden movements or impact-shocks of the chip substrate 1600 which could affect the performance of other sensors (disruptions to the oscillator 1200 creating timing errors in the GPS 1400, blurring the image from the optical sensor array 1500, creating short-term bias in the GPS 1400 reading, etc.). The motion data (rotation and/or acceleration) from the gyroscope 1100, therefore, can be used to offset (e.g. correct) errors caused by movement or impact. This offset (as well as the offsets from the other sensors 1200,1400,1500) can be done directly by the signal processor 1300 (i.e. real time correction) or in post-processing. It is also possible to directly correct drift errors in the gyroscope by physically compensating the gyroscope (for example, force rebalancing).

Oscillator 1200

An on-chip oscillator 1200 (used, for example, for providing accurate timing for the other sensors, such as the GPS 1400) can be MEMS fabricated on-chip by using a quartz resonator for high accuracy (MEMS resonators made of Si can potentially be integrated with MEMS non-Si gyroscopes, but their accuracy is not as high as that of quartz resonators). By tracking the fundamental versus the third or fifth harmonic modes for a quartz resonator of the oscillator 1200, the temperature of the chip can be accurately tracked. By occasional exciting the higher harmonic modes and processing the frequency differences, one can monitor the temperature of the quartz and correct for errors in other sensors (e.g. gyroscope 1100 bias drift based on the temperature of the resonators sitting on the substrate). This can provide a more accurate sensor output compared to sensing the temperature with a separate thermal sensor off-chip. This also allows for single-chip operation with temperature compensation without the need for adding a separate sensor on chip 1600. However, this is only possible if the oscillator 1200 can be situated on the chip in a manner that ensured that the temperature changes of the oscillator quartz is approximately equal to the temperature changes of the other sensors 1100,1400,1500. One way of ensuring this is by placing the sensors 1100,1200,1400, 1500 on the same chip, in close proximity to each-other, and sealed under the same protective cover.

Optical Sensor Array 1500

While it may be impractical to fabricate a sensor array 1500 on the same chip 1600 as the other sensors 1100,1200,1400, a chip-fabricated array 1500 can be bonded to an INS chip 1600, thereby coupling their environmental effects (e.g. vibrations detected on the INS chip 1600 will be nearly identical to the vibrations experienced on the array 1500). In this way, vibrations and sudden changes in motion detected by INS components, such as the gyroscope 1100, can be used to offset image blurring on the array 1500 caused by those vibrations or sudden movements. Likewise, the optical sensor array 1500 can, through image tracking/scanning determine the velocity of the INS relative to the fixed external environment (the ground, stellar objects, buildings, etc.) to correct errors in other sensors, such as drift of the gyroscope 1100 or small-scale deviations in the GPS 1400 data.

GPS and Signal Processor

Global positioning system (GPS) electronics 1400 can be embedded on-chip by well-known means. Likewise, the signal processor (SP) circuitry 1300 can be embedded on-chip, and may even be integrated with the GPS 1400.

Integration

As stated above, one factor in allowing these synergistic error offset relationships between the INS/GPS components 1100,1200,1400,1500 is the proximity of the components to each other. One issue that was needed to be overcome in the goal of placing a gyroscope 1100 and a quartz oscillator 1200 on the same chip 1600 in close proximity to each other is developing a fabrication method that allows bonding and etching of a disk resonator gyroscope (DRG) 1100 without damaging the oscillator 1200. This disclosure reveals that this is now possible. One solution is found in two parts. First, using a low-temperature bonding technique to place the DRG 1100 on the substrate 1600 after the oscillator 1200 has been placed on the wafer 1600. Second, using different materials for the DRG 1100 and the oscillator 1200 (for example, a silicon resonator DRG 1100 and a quartz resonator oscillator 1200) so that selective etching techniques can be used to etch the DRG 1100 without damaging the thin oscillator components, allowing the DRG 1100 to be placed in close proximity to the oscillator 1200.

Figure 2H:
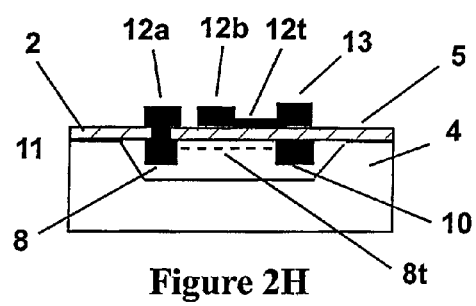

A method of fabricating a quartz resonator according to an embodiment of the present disclosure will now be described with reference to FIGS. 2A-2M. Referring to FIG. 2A, a handle substrate 4 could be provided. The handle substrate 4 may comprise a material such as silicon or GaAs. In this embodiment, both the handle substrate 4 and quartz substrate 2 (see FIG. 2C) may be provided in the form of a 3 inch or larger wafers. A portion of the handle substrate 4 may be etched away creating a cavity 6, as shown in FIG. 2B. The etched cavity 6 may be fabricated with a wet etch of potassium hydroxide, or a dry reactive ion etch (RIE) using a gas having a fluorine chemistry. FIG. 2C-P shows the plan view (top side 3) of FIG. 2C.

The first surface 3 of the quartz substrate 2 may then be patterned and metallized using a lift-off technique. In the lift-off technique, a thin layer of photoresist 7 may be patterned on the first surface 3 of the quartz substrate 2, as shown in FIG. 2C. Using lithography, photoresist could be removed in the regions where metallization is desired. The metal may then be deposited on the photoresist 7 and in the regions where the photoresist 7 was removed. The photoresist may then be removed leaving metal in the desired regions on the first surface 3 of the quartz substrate 2 as shown in FIG. 2D. During patterning and metallizing, at least one first conductive interconnect 8 could be deposited on the first surface 3 of the quartz substrate 2. The first conductive interconnect 8 may include a combination of Ti, Pt, Au, or Cr, Pt, Au, deposited preferably in that order on the first surface 3 of the quartz substrate 2 preferably in that order. Additionally, a first electrode 10 may be deposited on the first surface 3 of the quartz substrate 2. The first electrode 10 may include Ti—Au, Cr—Au, or Al. The first conductive interconnect 8 includes a first conductive channel 8$t$ to the first electrode 10, as shown in FIG. 2D-P (the plan view of FIG. 2D).

After the first conductive interconnect 8 and the first electrode 10 are deposited, the quartz substrate 2 may be bonded to the etched handle substrate 4, as shown in FIG. 2E using for example, an EV 501 Wafer Bonder which is commercially available. To bond the quartz substrate 2 to the handle substrate 4, the quartz substrate 2 and handle substrate 4 may be thoroughly cleaned in a megasonic cleaning system, which makes use of ultrasonic waves to remove particle contaminants. After the wafers are cleaned, they may be brought in contact with each other. The contact between the quartz substrate 2 and the handle substrate 4 may create a bond due to the well-known van der Waals force. The first conductive interconnects 8 and the first electrode 10 could now be located in the cavity 6 of the handle substrate 4.

The second surface 5 of the quartz substrate 2 may remain exposed, and may undergo a thinning process, shown in FIGS. 2E and 2F. In order to thin the quartz substrate 2, the following method can be used. For exemplary purposes only, the quartz substrate 2 has an initial thickness of 500 micrometers. A first portion of the quartz substrate 2 may be removed by thinning the quartz substrate from about 500 micrometers to 50 micrometers using a mechanical lapping and polishing system. Lapping and polishing systems are well known and commercially available. In a mechanical lapping and polishing system, a polishing head is spun at a high rate of speed. The lapping and polishing system also comprises a nozzle for dispensing slurry on the quartz substrate 2. While spinning, the polishing head may contact the quartz substrate in the presence of the slurry, thereby evenly grinding away portions of the quartz substrate 2. The slurry may be comprised of chemicals such as aluminum oxide to remove quartz from the quartz substrate 2.

Next, a second portion of about 1 micrometer of quartz may be removed from the quartz substrate 2, to help ensure a smooth surface. This could be done with the above described mechanical lapping and polishing system, except a softer chemical such as colloidal silica or Cerium oxide may be used in the slurry to remove quartz from the quartz substrate 2.

Next, a third portion of the quartz substrate 2 may be removed to reduce the thickness of the quartz substrate 2 to less than 10 micrometers using reactive ion etching (RIE) with $CF_4$ or $SF_6$ gas 9. After using RIE to remove quartz from the quartz substrate 2, the surface of the quartz substrate 2 may have imperfections that may need to be corrected. This may be done by using the mechanical lapping and polishing system described above with a chemical such as silica or Cerium oxide, to remove about 0.01-0.02 micrometers of quartz, followed up with a wet etch in ammonium bifluoride to remove about 0.005 micrometers of quartz from the quartz substrate 2, resulting in a structure as shown in FIG. 2F. This additional step may help ensure a polished, substantially imperfection-free quartz substrate 2.

Figure 2I:
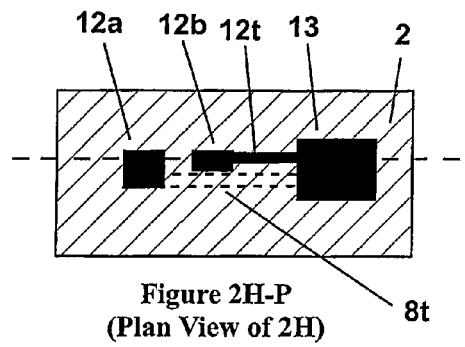
Figure 2I:
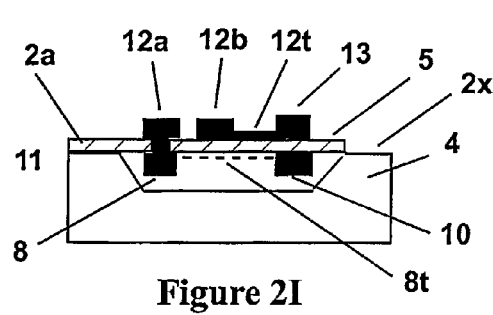
Figure 2J:
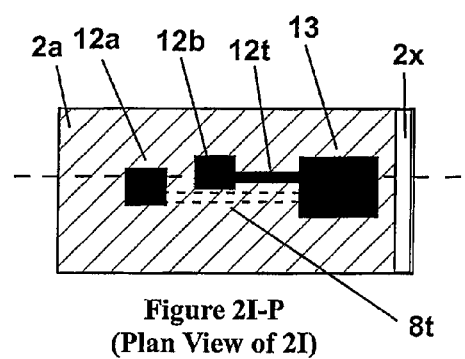
Figure 2J:
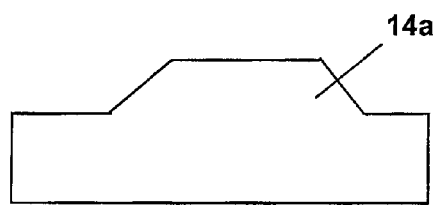
Figure 2K:
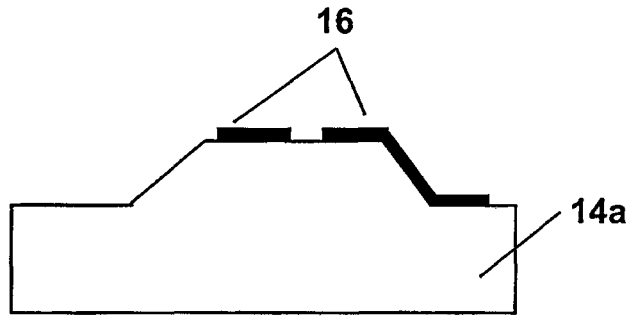
Figure 2L:
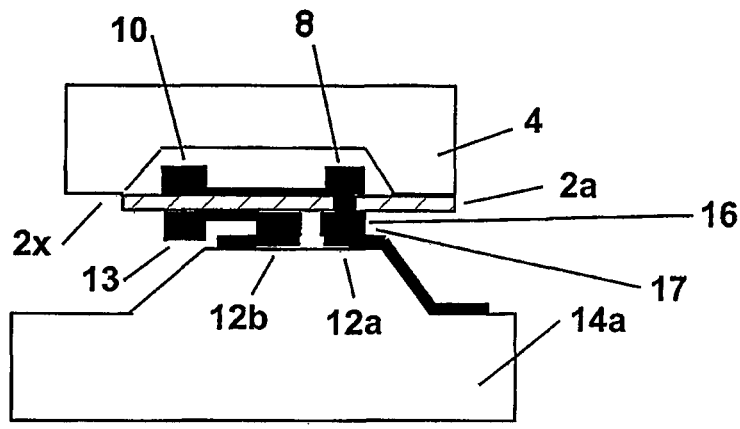
Figure 2M:
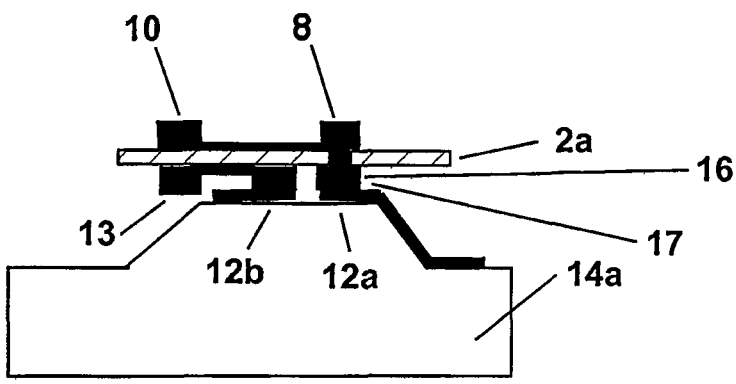

After the quartz substrate 2 is thinned, a via 11 may be fabricated in the quartz substrate 2, as shown in FIG. 2G and the plan view of FIG. 2G, FIG. 2G-P. The via 11 may be created using lithography techniques well-known in the art. The via 11 allows contact through the quartz substrate 2 to the first conductive interconnects 8. Once the via 11 is fabricated, the via may be metallized and the second surface 5 of the quartz substrate 2 may be patterned and metallized, as shown in FIG. 2M, using the lift-off technique described for depositing the first conductive interconnect 8. During the metallization step, second and third conductive interconnects 12$a$, 12$b$ may be deposited on the second surface 5 over the via 11. The second and third conductive interconnects 12$a$,12$b$ may be made up of a combination of Ti, Pt, Au, or Cr, Pt, Au, deposited preferably in that order on the second surface 5 of the quartz substrate 2 preferably in that order.

The first and second conductive interconnects 8, 12$a$ are now connected through the via 11. Additionally, a second electrode 13 may be deposited during the step of depositing the second and third conductive interconnects 12$a$, 12$b$, as shown in FIG. 2H. The second electrode 13 may be composed of Ti—Au, Cr—Au, or Al. The third conductive interconnect includes a second conductive channel 12$t$ that connects to the second electrode 13. It may be preferable to avoid having the two conductive channels 8$t$,12$t$ aligned with each other on opposite sides of the quartz substrate 2, because alignment of those elements may cause unwanted resonation effects. Once the conductive interconnects 8, 12$a$, 12$b$ and first and second electrodes 10, 13 have been deposited, a portion 2$x$ of the quartz substrate 2 may be removed, thereby creating a modified quartz substrate 2$a$, as shown in FIG. 2I. Such portion is removed using lithography and REI techniques well-known in the art to divide the quartz substrate into individual devices and determine the desired dimensions of the quartz substrate 2$a$.

By ablating a portion of the first and second electrodes 10, 13, the resonant frequency of the quartz substrate 2$a$ may be adjusted. However, it is also possible to adjust the resonant frequency by ablating a portion of the conductive interconnects 8, 12$a$, 12$b$. The first and second electrodes 10, 13 may be ablated using known techniques such as focused ion beam milling or laser ablation.

As already mentioned above with reference to the detailed description of FIG. 2A, a base substrate 14 is provided. The base substrate 14 is made of a group III-V material or SiGe. FIG. 2J shows a modified base substrate 14$a$, where a portion of the base substrate 14 shown in FIG. 2A has been removed (or, alternatively, a portion of the base substrate 14 has been increased by further deposition). The removal of a portion of the base substrate 14 may be done using lithography techniques well-known in the art. At least one probe pad 16 may be deposited on the modified base substrate 14$a$. FIG. 2K shows, for example, two probe pads 16. The probe pads may be deposited using the same lift off technique used to deposit the at least one first conductive interconnect 8 discussed previously. The probe pads 16 may be include gold/germanium alloy, nickel, and gold deposited preferably in that order.

After the probe pads 16 have been deposited on the modified base substrate 14a, the bottom conductive interconnects 12a, 12b of the modified quartz substrate 2a may be bonded to the probe pads 16 along bonding line 17, as shown in FIG. 2L, using an Au—Au compression bonding scheme. In the Au—Au compression bonding scheme, the quartz substrate 2, the second and third conductive interconnects 12a, 12b, the probe pads 16, and the modified base substrate 14a may be heated to a temperature greater than 300° C. in a vacuum having a pressure no greater than $10^{-4}$ Torr. Then the second and third conductive interconnects 12a, 12b and probe pads 16 may be pressed together, while depressurized, with a pressure of approximately 1 MPa. This may fuse the probe pads 16 and the conductive interconnects 12a, 12b together, as shown in FIG. 2L.

The above described bonded structure may provide electrical access from the probe pads 16 to the first conductive interconnects 8. After the conductive interconnects 12a, 12b have been bonded to the probe pads 16, the handle substrate 4 may be removed from the remaining structure, so that a structure like the one shown in FIG. 2M could be obtained.

The purpose of the first and second conductive interconnects 8, 12 is to receive an electrical signal from the probe pads 16. This signal is then, in turn, delivered to the electrodes 10, 13 which bias or drive the modified quartz substrate 2a with an electric field. The electrical signal may preferably be an AC signal. When the electrical signal is received by the first and second electrodes 10, 13 a strain is placed on the modified quartz substrate 2a. This strain stimulates the mechanical resonant frequency of the modified quartz substrate 2a by the well-known piezoelectric effect, thereby causing the modified quartz substrate 2a to oscillate at its resonant frequency. Additionally, it is also possible to use the first and second electrodes 10, 13 to sense the movement of the modified quartz substrate 2a relative to a specified plane (not shown). Once the modified quartz substrate 2a is oscillating at its resonant frequency, it may be used to drive other components at a frequency equal to its resonant frequency.

Figure 3A:
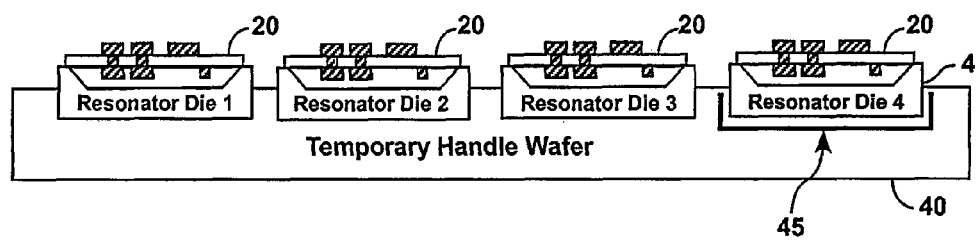
FIGS. 3A-3B depict a process for reassembling resonators for the oscillators on a single INS/GPS chip (prior art).
Figure 3B:
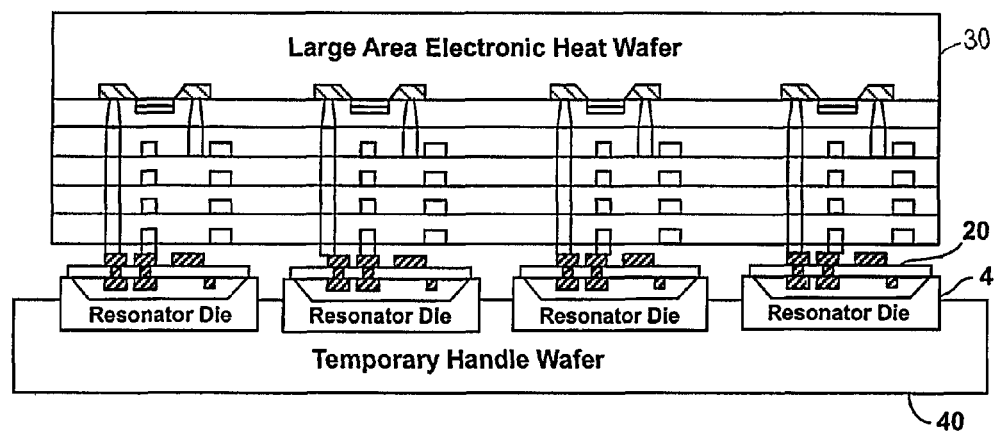

FIGS. 3A and 3B show a process for assembling a quartz resonator 20 for integration on a common substrate, such as an electronics host wafer 30, for a navigation system of the present disclosure. FIG. 3A shows a temporary silicon-group handle wafer 40 fully populated with quartz resonators. The quartz resonators 20 may be placed into the pre-etched receptacles 45 of the group handle wafer 40, such as by using a pick-and-place tool (not shown). A silicon handle wafer 4 is also shown in FIG. 3A.

FIG. 3B shows an assembly of an array of quartz resonators 20 held by the temporary silicon-group handle wafer 40 onto the electronics host wafer 30 using wafer-to-wafer bonding. The group handle wafer 40 with the attached quartz resonators 20 may be aligned with the electronics host wafer 30. The quartz resonators 20 could then be bonded to the electronics host wafer 30 using a wafer-to-wafer bond. A bonder (not shown), such as EV Group's "EVG520" Semi-Automated Wafer Bonding System, may be employed for this purpose.

Figure 4A:
FIGS. 4A-4M depict a process of fabricating an on-chip INS that resides on a single chip.
Figure 4B:
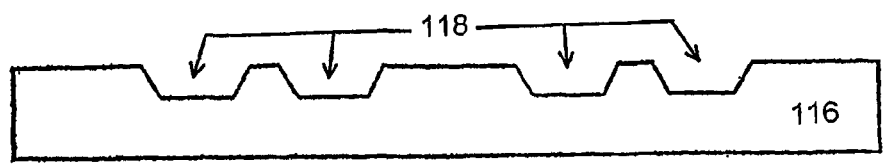
Figure 4C:
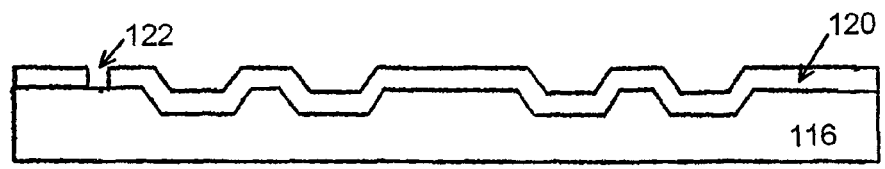
Figure 4D:
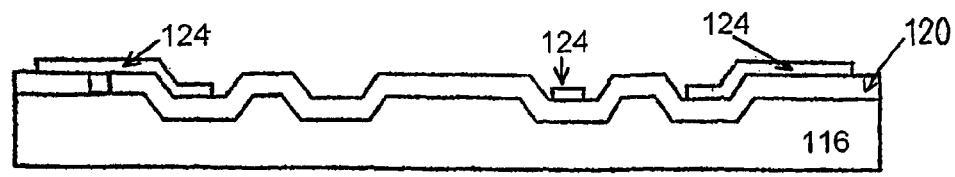
Figure 4E:
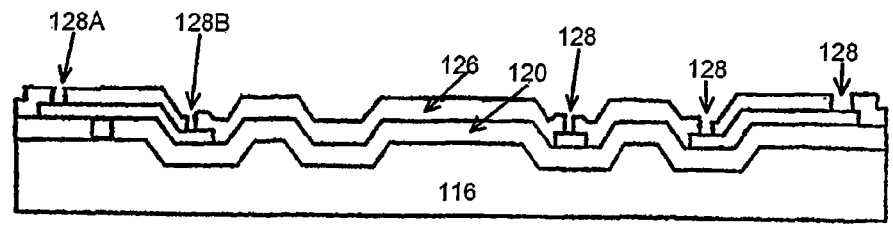
Figure 4F:
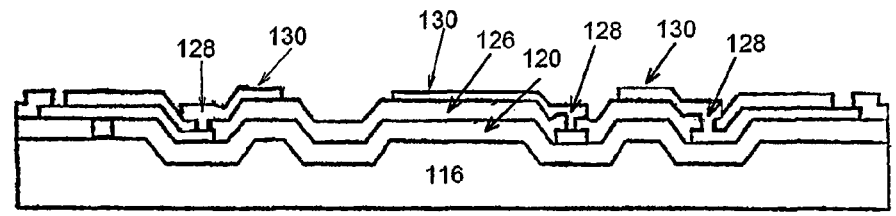

FIGS. 4A through 4M depict a process for fabricating an on-chip INS that includes a Si DRG and a quartz oscillator in close proximity. FIG. 4A shows a substrate 116 that can serve as the base for the top-side components, including a DRG and an oscillator. The substrate can be composed of a semiconductor material, such as silicon, SiGe, or a group III-V material. Typically, this substrate can be previously fabricated with built-in circuitry such as signal processors and/or GPS. As shown in FIG. 4B, one or more recesses 118 can be etched in the substrate 116 to provide geometry for the components to be added to the substrate 116. Alternatively, the recesses 118 can be formed by depositing additional layers upon the substrate 116 surrounding the recessed areas 118. The geometry can provide connection between the later-added top-side components (such as the DRG and the oscillator) and the substrate 116 circuitry. FIG. 4C shows a thermal oxide layer 120 being deposited on the substrate 116. Top-side vias 122 in the thermal oxide layer 120 can be etched or otherwise provided to allow access to the substrate 116 by depositing conductive material in the via. This is especially important if there are going to be further components in or under the substrate 116 (such as GPS and/or signal processing circuitry in the substrate). FIG. 4D show metal interconnects 124 being deposited over the thermal oxide layer 120. FIG. 4E shows a dielectric 126 deposited over the exposed surface with one or more vias 128 etched in the dielectric 126 to allow access to the metal interconnects 124. FIG. 4F show the depositing of bond metal 130 through the vias 128 to provide connection points for the top-side INS components, such as the DRG and the oscillator.

Figure 4G:
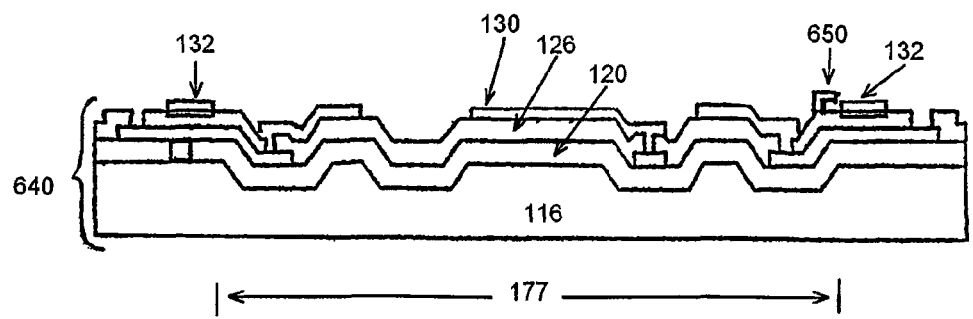
Figure 4H:
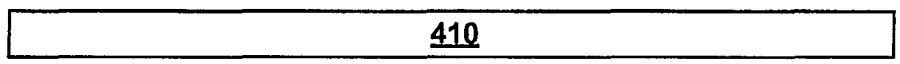
Figure 4I:
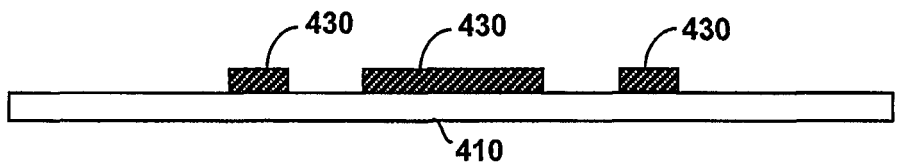
Figure 4J:
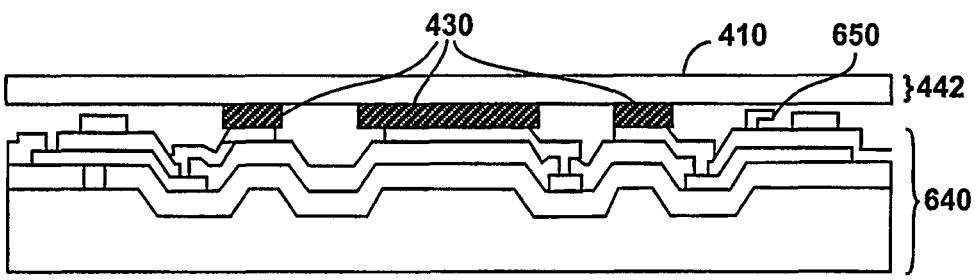
Figure 4K:
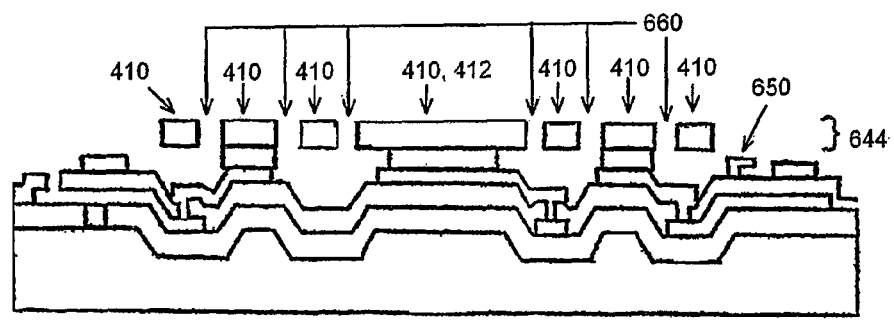

FIG. 4G-1K shows a placement of INS components on the base platform 640. As shown in FIG. 4G, a seal ring 132 can be deposited, encircling the area 177 where the top-side INS components will be placed, thus creating a base platform 640 for the INS. The top-down geometry of the ring 132 can be any closed figure (circle, square, oval, etc.). At this stage, the oscillator 650 can be added as shown in FIGS. 2A-2R and 3A-3B. A gyroscope resonator wafer 410, as shown in FIG. 4H, is selected on the criterion that the material of the wafer 410 cannot be the same as the material that the resonator of the oscillator 650 is composed. An example, which shall be used in this embodiment, would be a silicon resonator wafer 410 and a quartz oscillator resonator 650. Bond metal 430 is deposited on the resonator wafer 410 in a pattern for forming a disk resonator gyroscope (DRG). FIG. 4J depicts the bonding of the resonator wafer 410 onto a base platform 640 that had previously had the quartz oscillator 650 deposited. A circuitry wafer 690 containing, for example, analog/digital low-powered CMOS circuitry for additional components, such as a GPS and/or a signal processor, could also have been bonded to the opposite side of the base platform 640. Since the oscillator 650 could be damaged by excessive heat, the resonator wafer 410 should be bonded to the base platform 640 using a low-temperature bonding technique, such as Au—In compression bonding or Au—Sn compression bonding. In the Au—In thermal compression bonding scheme, the components are heated to a temperature of about 100° C. to 300° C. in a vacuum having a pressure no greater than $10^{-4}$ Torr. Then the bond metal pads 430, 130 of the components may be pressed together, while being depressurized, with a pressure of approximately 1 MPa. FIG. 4K depicts the resonator wafer 410 being etched 660 in a pattern to create a DRG (see FIG. 4M). Since the resonator of the oscillator 650 is thin relative to the resonator of the DRG 410, it is desirable to use an etching method that will etch the DRG resonator 410 material, but not the oscillator resonator 650 material. In this example, because the DRG resonator 410 material is silicon (see above) and the oscillator resonator 650 material is quartz, the DRG can be etched using a deep reactive ion etching (DRIE) process. A fluorine-based plasma DRIE process will not degrade the quartz resonator. In the case of DRIE etching, the electrodes and conductive interconnects for the oscillator 650 should be composed of a metal which would also not be degraded by the process, such as Al. This exemplifies why different materials were selected for the two resonators: if the DRG resonator 410 and the oscillator resonator 650 were both composed of silicon, the DRIE process would likely destroy the oscillator resonator 650 unless extremely narrow tolerances on the DRIE etching depth were utilized.

Figure 4L:
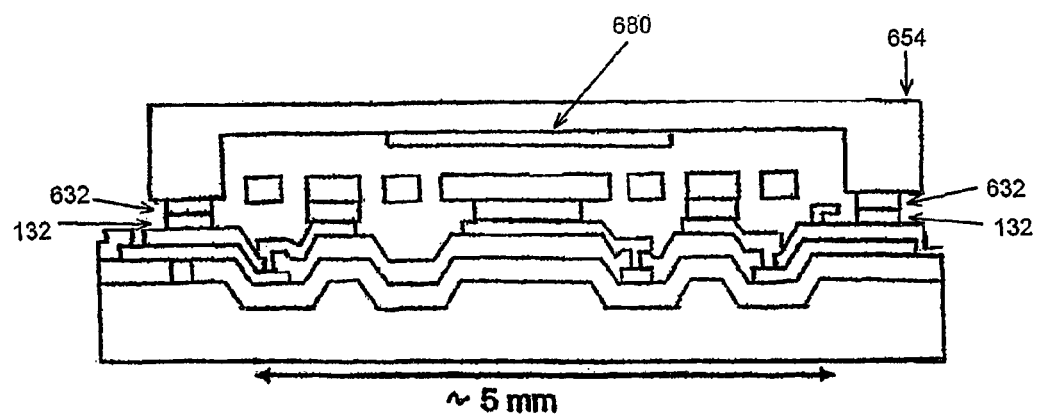

FIG. 4L shows the bonding of a sealed cover 654 over the components. The cover 654 can include a mating seal ring 632 to be aligned and bonded to the base seal ring 132. This process could provide wafer-level vacuum packaging with a getter 680 placed on the cover to absorb free gases. The getter 680 could be Ti-based, but the utilization of other getter materials are well known in the art. In addition to protecting the components from dust and humidity from the environment, the cover 654 also helps ensure that environmental changes (temperature, vibration, etc.) to one component within the sealed area 177 is approximately the same as the environmental change in other components within that area 177.

Figure 4M:
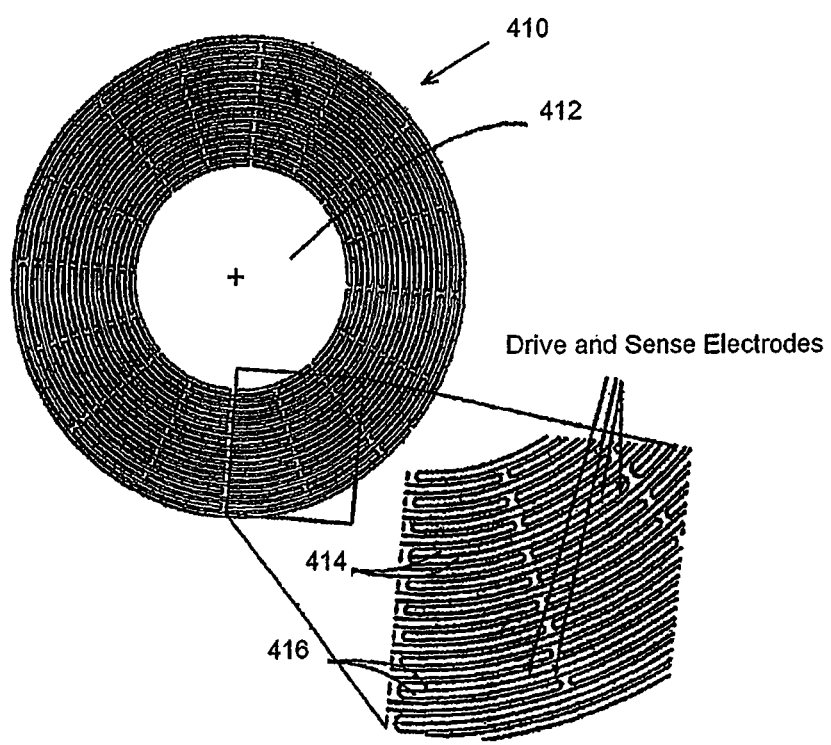

FIG. 4M shows a possible plan view of the etched DRG wafer 410 as shown in FIGS. 4K and 4L, essentially as described in US publication 2007/0017287 at paragraph [0056], with the exception that the disc 410 in this example is composed of silicon. An advantage of the DRG of this general design is that it is capable is a multi-axis rate sensor capable of sensing rotation and acceleration along three orthogonal axes. A quartz disc 410 is possible, so long as the oscillator resonator 650 is then composed of a material other than quartz and an etching method is used that etches quartz but not the other material. The other material would also need to be operative as a resonator. A planar disc resonator 410 fabricated of silicon where etching may be used to slot the disc into a system of interconnected rings supported at a central support 412 with internal drive and sense electrodes 414, 416. The internal drive and sense electrodes 414, 416 are formed from the silicon material left in the circumferential slots of the disc resonator 410. The drive and sense electrodes 414, 416 are electrostatic and may operate in paired halves within a single slot, e.g. an inner half and outer half divided along the length of the slot. Thus, the drive and sense electrodes 414, 416 generally interact with the disc resonator in the plane of the disc across narrow gaps between the electrodes 414, 416 and the disc structure. Location of the drive and sense electrodes 414, 416 can be varied, however, it is desirable to position the sense electrodes 416 towards the outside edge of the disc resonator 410 to enhance sensitivity. Both the central support 412 and the drive and sense electrodes 414, 416 are supported at high spots on an etched silicon baseplate (not shown). Electrical connections to the drive and sense electrodes 414, 416 can be achieved through an etched metallic layer deposited on the etched silicon baseplate. Additional bias (or trim) electrodes may also be employed to assist in tuning the resonator and improving overall performance. The bias electrodes are incorporated into the structure along with the drive and sense electrodes and are used for tuning the frequency of the modes electrostatically for optimal performance. Embodiments of the invention are operable with any planar resonator design which may incorporate a unique architecture comprising drive and sense electrodes as well as bias electrodes. Embodiments of the invention are not limited to any particular resonator architecture.

Figure 5A:
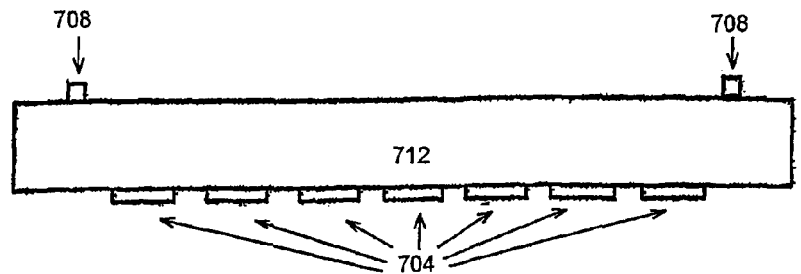
FIGS. 5A-5C depict a process of bonding an optical array to an on-chip INS.
Figure 5B:
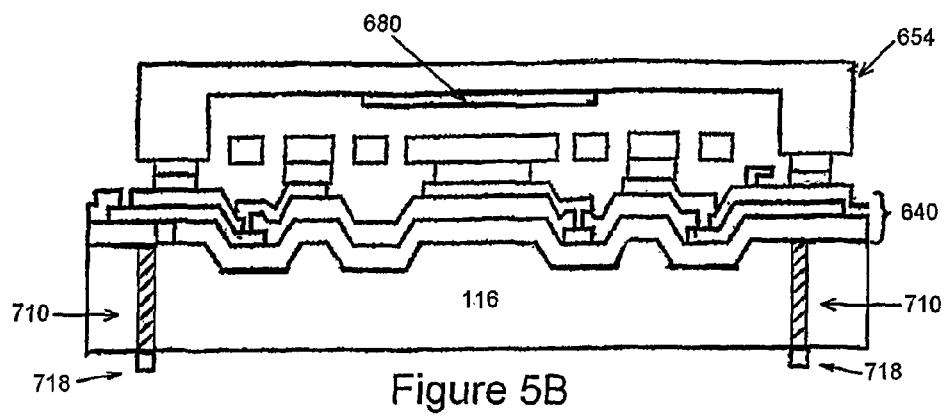
Figure 5C:
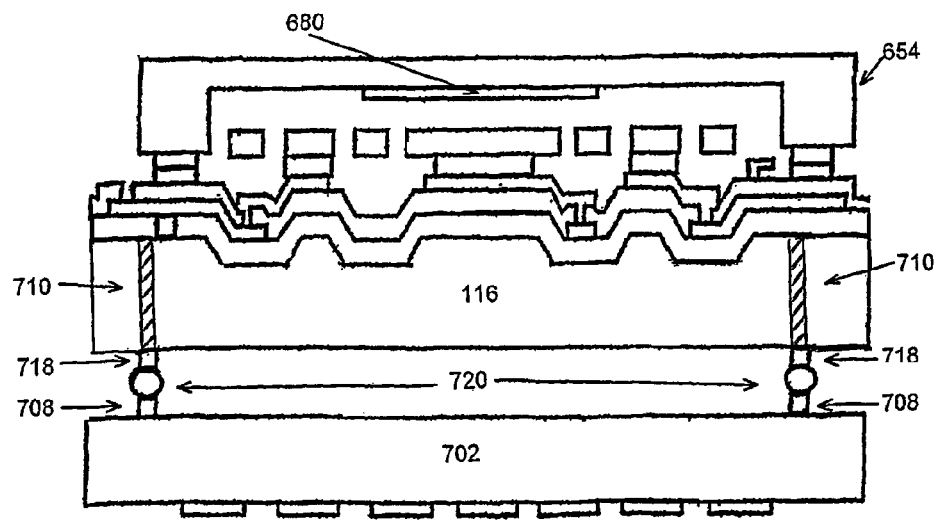

FIGS. 5A-5C show the optional addition of an image sensor array to the INS system previously depicted in FIG. 4L. The sensor array can be characterized as having an imager base layer 702 that contains the sensor electronic components, various photo-electric sensors 704 arranged in an array on one side of the imager base layer 702, and imager electrodes 708 connected to the sensor circuitry and exposed on the opposite side of the imager base layer 702 from the sensors 704, as seen in FIG. 5A. The sensors 704 could be any form of photo-electric sensor appropriate for an imaging system, including non-visible light sensors (for example, an IR imaging array). FIG. 5B shows a fabricated INS where the circuitry layer 116 of the INS was fabricated with conductive vias 710 connecting the base layer 640 and/or the circuitry within the circuitry layer 116 to INS electrodes 718 on circuitry layer 116 on the side opposite the sensors 704. The INS electrodes 718 and the imager electrodes 708 are then aligned and bonded, as shown in FIG. 5C. Again, to avoid damaging the components of the both the imaging sensor and the INS, a low-temperature bonding technique is preferred, such as compression bump 720 bonding.

Figure 6:
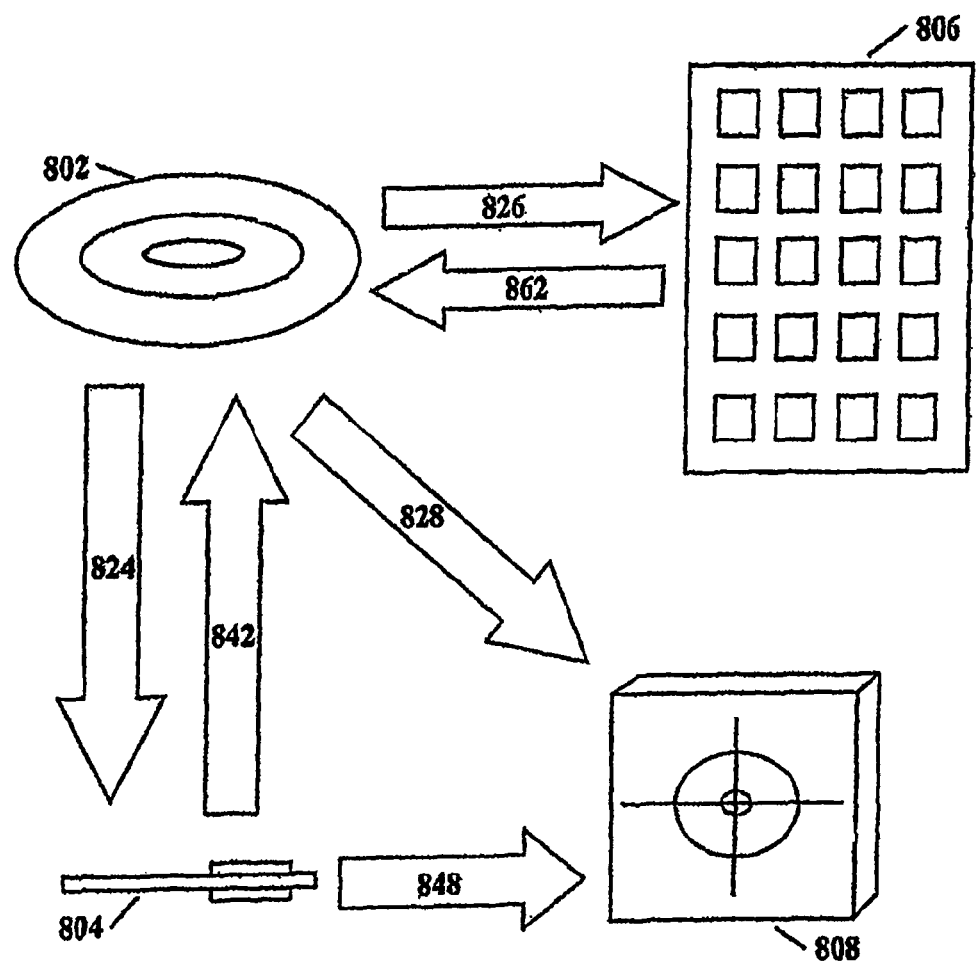
FIG. 6 shows how different components of an on-chip INS can be used for error correction for each other.

The system shown in FIG. 5C is appropriately designed to allow the error-correction technique shown in FIG. 6. FIG. 6 depicts a multi-sensor system containing a DRG 802, an oscillator 804, an imaging sensor array 806, and a GPS system 808, however the method could also be utilized, with modification, by one skilled in the art for a compact INS as previously disclosed but with a different number of components.

FIG. 6 depicts the various error-correction relationships the components could have.

For example, the DRG 802 provides vibration and acceleration data which can be used to correct blurring 826 in the imaging sensor array 806 or short term bias drift 828 in the GPS 808 or phase noise 824 in the oscillator 804. By using force rebalance and/or signal processing corrections, the phase noise of the oscillator 804 can be reduced by about 40 dBc/Hz in high vibration environments. This would have to be done by a real-time error correction technique. The acceleration data from the DRG 802 could also be used with VCO (Voltage Controlled Oscillator) electronics to electronically tune the oscillator output frequency based on known acceleration sensitivities.

By tracking the fundamental versus the third or fifth harmonic modes for a quartz resonator of the oscillator 804, the temperature of the chip can be accurately tracked. By occasional exciting the higher harmonic modes and processing the frequency differences, one can monitor the temperature of the quartz. This temperature data can be used to correct for bias drift due to temperature 842 of the gyroscope 802. The oscillator 804 can also provide highly accurate timing 848 for the GPS 808.

The imaging array 806 can determine the velocity of INS relative to the Earth's surface by monitoring the frame-by-frame movement of fixed background images external to the INS (e.g. the ground, the stars, buildings) if the distance to the fixed background objects of the INS are known (e.g. altitude). This data can be used to compensate for acceleration bias 862 in the DRG 802.

As used in this specification and appended claims, the singular forms "a," "an," and "the" include plural referents unless the specification clearly indicates otherwise. The term "plurality" includes two or more referents unless the specification clearly indicates otherwise. Further, unless described otherwise, all technical and scientific terms used herein have meanings commonly understood by a person having ordinary skill in the art to which the disclosure pertains.

As a person having ordinary skill in the art would appreciate, the elements or blocks of the methods described above could take place at the same time or in an order different from the described order.

It should be emphasized that the above-described embodiments are merely some possible examples of implementation, set forth for a clear understanding of the principles of the disclosure. Many variations and modifications may be made to the above-described embodiments of the invention without departing substantially from the principles of the invention. All such modifications and variations are intended to be included herein within the scope of this disclosure and the present invention and protected by the following claims.

What is claimed is the following:

1. A process for fabricating an on-chip inertial navigation system apparatus, the process comprising:
    providing a semiconductor substrate;
    depositing an oscillator on the semiconductor substrate, the oscillator including a resonator being composed of a first material;
    bonding a gyroscope resonator wafer to the semiconductor substrate with a low temperature bonding technique, the gyroscope resonator wafer being composed of a second material; and
    etching the gyroscope resonator wafer after it is bonded to the semiconductor substrate and after the oscillator is deposited on the semiconductor substrate, the etching using an etching technique that will etch the second material but not etch the first material, the etching forming a gyroscope.

2. The process of claim 1, wherein the first material is quartz and the second material is silicon.

3. The process of claim 2, wherein the etching technique is fluorine-based plasma deep reactive ion etching.

4. The process of claim 1, wherein the low-temperature bonding technique includes Au—In compression bonding.

5. The process of claim 4, wherein the Au—In compression bonding includes a temperature between 100 and 300 degrees Celsius and a pressure no greater than 0.0001 Torr.

6. The process of claim 1, further comprising sealing the gyroscope and the oscillator under a cover.

7. The process of claim 6, wherein the sealing includes wafer-level vacuum with a getter.

8. A process for making an on-chip inertial navigation system apparatus, the process comprising:
    providing a semiconductor substrate;
    forming an oscillator on the semiconductor substrate, the oscillator including a resonator being composed of a first material;
    bonding a gyroscope resonator wafer to the semiconductor substrate, the gyroscope resonator wafer being composed of a second material different from said first material; and
    etching the gyroscope resonator wafer after it is bonded to the semiconductor substrate and after the oscillator is formed on the semiconductor substrate using an etching technique that will etch the second material but not etch the first material, the etching forming a gyroscope.

9. The process of claim 8, wherein the first material is quartz and the second material is silicon.

10. The process of claim 9, wherein the etching technique is fluorine-based plasma deep reactive ion etch.

11. The process of claim 8, wherein the bonding step includes forming an Au—In compression bond.

12. The process of claim 11, wherein the Au—In compression bond is formed at a temperature between 100 and 300 degrees Celsius and at a pressure no greater than 0.0001 Torr.

13. The process of claim 8, further comprising sealing the gyroscope and the oscillator under a cover.

14. The process of claim 13, wherein the sealing step includes wafer-level vacuum with a getter.

* * * * *